US010698101B2

(12) United States Patent
Martinez-Lorenzo

(10) Patent No.: US 10,698,101 B2
(45) Date of Patent: Jun. 30, 2020

(54) COMPRESSIVE CODED ANTENNA/META-ANTENNA

(71) Applicant: Northeastern University, Boston, MA (US)

(72) Inventor: Jose Angel Martinez-Lorenzo, Wellesley, MA (US)

(73) Assignee: Northeastern University, Boston, MA (US)

( * ) Notice: Subject to any disclaimer, the term of this patent is extended or adjusted under 35 U.S.C. 154(b) by 268 days.

(21) Appl. No.: 15/562,349

(22) PCT Filed: Mar. 31, 2016

(86) PCT No.: PCT/US2016/025274
§ 371 (c)(1),
(2) Date: Sep. 27, 2017

(87) PCT Pub. No.: WO2016/167979
PCT Pub. Date: Oct. 20, 2016

(65) Prior Publication Data
US 2018/0356515 A1      Dec. 13, 2018

Related U.S. Application Data

(60) Provisional application No. 62/147,363, filed on Apr. 14, 2015.

(51) Int. Cl.
*G01S 13/89*      (2006.01)
*G01S 13/06*      (2006.01)
(Continued)

(52) U.S. Cl.
CPC ............ *G01S 13/89* (2013.01); *G01S 13/006* (2013.01); *G01S 13/06* (2013.01); *H01Q 15/16* (2013.01); *G01S 2013/0236* (2013.01)

(58) Field of Classification Search
CPC ........ G01S 13/89; G01S 13/006; G01S 13/06; G01S 2013/0236; G01S 13/343; G01S 13/46; G01S 13/003; H01Q 15/16
See application file for complete search history.

(56) References Cited

U.S. PATENT DOCUMENTS 5,677,491 A * 10/1997 Ishrak .................. A61B 8/4483
                                                            310/335
7,280,068 B2 * 10/2007 Lee ......................... G01S 13/89
                                                            342/179
(Continued)

FOREIGN PATENT DOCUMENTS

CA         2658458 A1 *   1/2009  ............. G01T 1/295

OTHER PUBLICATIONS

J. A. Martinez Lorenzo et al., "Single-Transceiver Compressive Antenna for High-Capacity Sensing and Imaging Applications"; published in the proceeding of the "2015 9th European Conference on Antennas and Propagation (EuCAP)"; Date of Conference Apr. 13-17, 2015; IEEE; Piscataway, NJ, USA. (Year: 2015).*
(Continued)

*Primary Examiner* — Bernarr E Gregory
(74) *Attorney, Agent, or Firm* — Hamilton, Brook, Smith & Reynolds, P.C.

(57) ABSTRACT

A system for sensing a target in a region of interest (ROI) includes a coded compressive antenna (CCA) to generate an EM field codified in multiple dimensions. One or more receivers receives EM energy reflected by the target, and produces reflection information corresponding to the reflected energy. A compressive sensing imaging processor analyzes reflection information to generate an image representing the target. The CCA may use a distorted reflector, a vortex lens, and/or meta-materials to codify the EM field in multiple dimensions. The system may evaluate a sensing matrix that characterizes the transmission channel and the
(Continued)

codified EM field. The system configures the CCA to produce a coded EM field enhances certain sensing matrix singular values, with respect to an EM field produced by a non-codified antenna. The sensing system provides increased target sensitivity while reducing false detections.

20 Claims, 11 Drawing Sheets

(51) Int. Cl.
*G01S 13/00* (2006.01)
*H01Q 15/16* (2006.01)
*G01S 13/02* (2006.01)
*G01S 7/02* (2006.01)

(56) References Cited

U.S. PATENT DOCUMENTS

| | | | | |
|---|---|---|---|---|
| 7,485,835 | B2* | 2/2009 | Weaver | H04N 5/2259 |
| | | | | 250/208.1 |
| 8,471,758 | B2* | 6/2013 | Samuel | G01S 13/90 |
| | | | | 342/25 A |
| 8,958,408 | B1* | 2/2015 | Jain | G01S 13/003 |
| | | | | 342/368 |
| 9,075,143 | B2* | 7/2015 | Brundick | G01S 13/89 |
| 9,268,016 | B2* | 2/2016 | Smith | G01S 13/89 |
| 9,291,711 | B2* | 3/2016 | Healy, Jr. | G01S 13/90 |
| 9,411,042 | B2* | 8/2016 | Brady | G01S 13/89 |
| 9,535,151 | B2* | 1/2017 | Lynch | G01S 3/46 |
| 9,581,681 | B2* | 2/2017 | Lynch | G01S 7/02 |
| 9,658,321 | B2* | 5/2017 | Lynch | G01S 13/343 |
| 2013/0169471 | A1* | 7/2013 | Lynch | G01S 13/343 |
| | | | | 342/107 |
| 2013/0169485 | A1* | 7/2013 | Lynch | G01S 13/66 |
| | | | | 342/417 |
| 2013/0335256 | A1 | 12/2013 | Smith et al. | |
| 2014/0077989 | A1* | 3/2014 | Healy, Jr. | G01S 13/90 |
| | | | | 342/25 F |

OTHER PUBLICATIONS

Watts, C.M., et al., "Coded and Compressive THz Imaging with Metamaterials", Proceedings of SPIE, vol. 8985, Mar. 7, 2014.
International Search Report for PCT/US2016/025274 dated Jan. 1, 2016 entitled "Compressive Coded Antenna/Meta-Antenna".
International Preliminary Report on Patentability for PCT/US2016/025274 dated Oct. 17, 2017 entitled "Compressive Coded Antenna/Meta-Antenna".

* cited by examiner

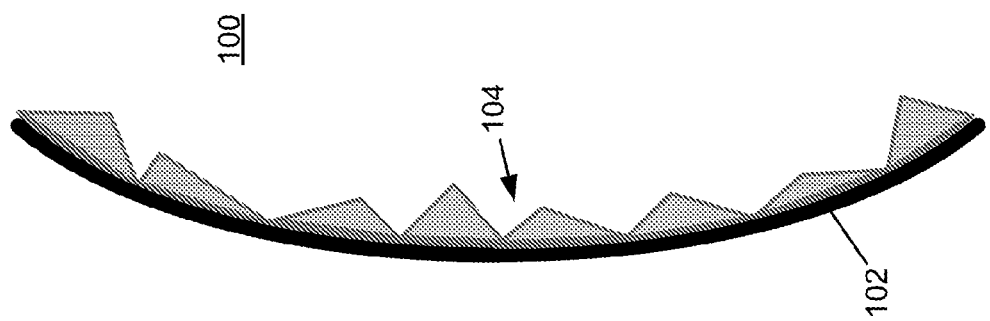
FIG. 1D
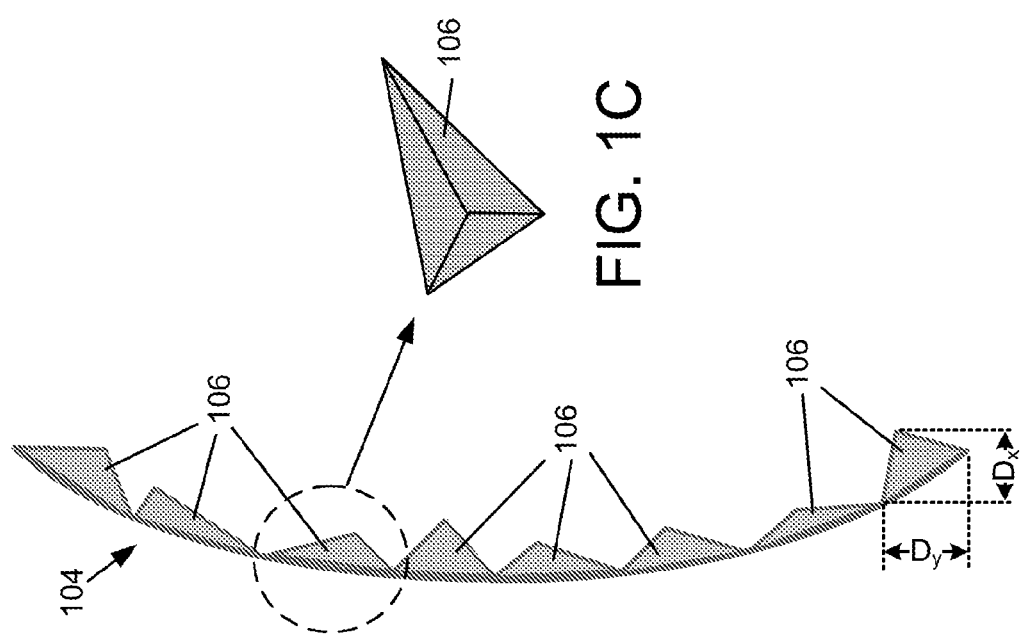
FIG. 1C
FIG. 1B
FIG. 1A

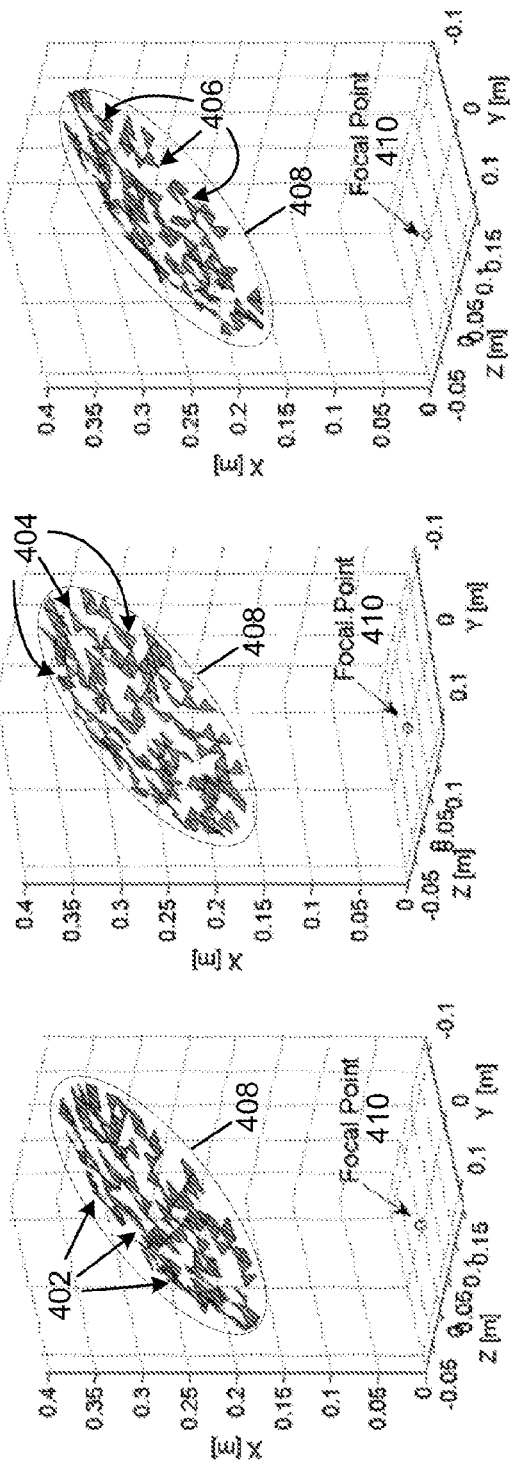
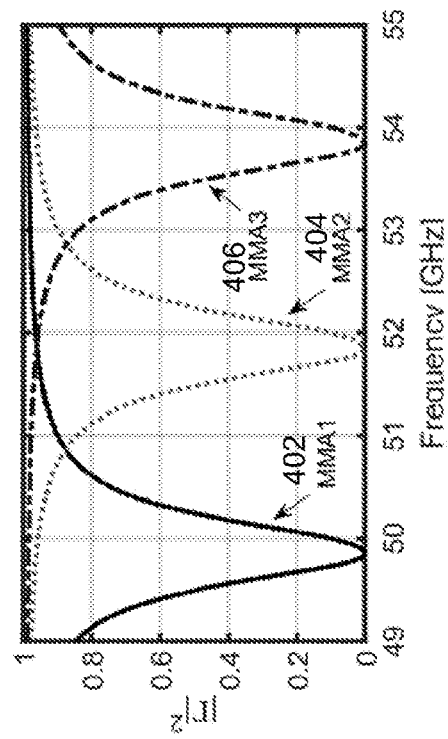
FIG. 4A
FIG. 4B
FIG. 4C
FIG. 4D

COMPRESSIVE CODED ANTENNA/META-ANTENNA

RELATED APPLICATION

This application is the U.S. National Stage of International Application No. PCT/US2016/025274, filed on Mar. 31, 2016, published in English, which claims the benefit of U.S. Provisional Application No. 62/147,363, filed on Apr. 14, 2015. The entire teachings of the above application are incorporated herein by reference.

BACKGROUND

Compressive Coded Antennas (CCAs) and Compressive Coded Meta Antennas (CCMAs) are recently-developed types of radiating elements. It has been shown that complementary-electric-inductor-capacitor (cELC) meta-materials can be used in a waveguide antenna to create a CCMA having multidimensional codification. Such systems have achieved quasi-real-time two dimensional (2D) imaging using a single transceiver and no phase shifters.

Despite the enhanced performance of such systems, however, several limitations exist with a waveguide-based CCMA. The multidimensional codes are fixed and cannot be changed once the waveguide-based CCMA has been designed and fabricated. Also, the resonance of the cELC meta-material is the only degree of freedom available to design the codification. Further, there is not a clear figure of merit that can be used to assess the performance of the CCMA system.

SUMMARY OF THE INVENTION

Compressive Coded Antennas (CCAs) and Compressive Coded Meta Antennas (CCMAs) are radiating elements capable of codifying electromagnetic (EM) fields in multiple dimensions. A CCMA is a form of a CCA, the CCMA including some form of frequency selective surface (e.g., metamaterials). As used herein, "codifying" EM fields refers to modifying, based upon an underlying code or pattern, certain characteristics of the radiated EM fields. The characteristics may include spatial location, time, frequency, polarization, angular momentum, or other aspects of the fields. Unlike traditional coded apertures, CCAs and CCMAs pseudo-randomly illuminate a broad space using multidimensional sub-beam-like codes in one or more of the field characteristics.

The ability to dynamically control coded EM fields in multiple dimensions has the potential to enhance the performance of future radar systems. Specifically, multi-dimensional coding has the potential to enhance the performance of currently deployed radar systems used in surveillance, detection, tracking, discrimination, engaging and interception tasks typically carried out in military-contested scenarios, while using a minimum number of transceivers and resources that not only reduce the cost and complexity of the system, but also contribute to decrease its overall energy consumption. Other applications may include non-destructive testing and evaluation.

Many techniques may be used to switch amongst different multidimensional coded EM field patterns, including but not limited to 1) electronic beam steering by using a focal plane array; 2) electronic beam steering by an electronically-reconfigurable sub-reflector; 3) electronic change of the constitutive parameters of the appliqué scatters (conductivity, permeability and permittivity); 4) mechanical rotation of the reflector along the axis of the parabola; and 5) mechanical rotation of a single feeding horn or array along the axis of the parabola. The described embodiments may utilize one or more of these techniques, combinations thereof, or one or more of these techniques combined with other embodiments described herein.

The described embodiments of a CCA or a CCMA are based on two principles: 1) Multi-dimensional codification of the EM field according to spatial location, time, frequency, polarization, angular momentum, or other aspects of the EM field, generated by a customized spatial coded reflector aperture (when operating on reflection mode) or spatial coded screen aperture (when operating on transmission mode), and 2) compressive sensing imaging, performed on under-sampled measured data.

The described embodiments may utilize one or more of the following components:
- a reflector distorted with a pseudo-random pattern
- one or more vortex lenses
- one or more meta materials
- codification of the electromagnetic field at different scales.

An embodiment of a system may evaluate a sensing matrix that characterizes a channel between the CCA and a target, and the codified EM field. The system configures the CCA to produce a coded EM field that enhances the smaller sensing matrix singular values to be closer to the largest sensing matrix singular value, thereby reducing dispersion. Less dispersion improves the channel sensing capacity of the system.

In one aspect, an embodiment of the invention may be a system for sensing a target in a region of interest (ROI). The system may comprise a coded compressive antenna (CCA) configured to generate an electro-magnetic (EM) field in the ROI. The EM field may be codified in two or more dimensions as a function of the CCA. The system may further include one or more EM energy receivers configured to receive EM energy reflected by the target in the ROI, and produce reflection information corresponding to the reflected EM energy. The system may further include a compressive sensing imaging processor configured to analyze the reflection information and to generate an image representing the target.

In one embodiment, the CCA may utilize two or more of a distorted reflector, at least one vortex lens, and meta-materials to provide codification of the EM field in two or more dimensions. In another embodiment, the two or more dimensions are selected from the group consisting of spatial location, time, frequency, polarization and angular momentum. In yet another embodiment, the codification of the EM field is implemented at two or more scales associated with the wavelength of the EM field.

In one embodiment, the CCA may generate the EM field by operating in reflective mode, reflecting EM energy generated by one or more EM energy sources. In another embodiment, the CCA provides spatial codification by reflecting EM energy from a reflector surface distorted by a plurality of three-dimensional appliqué scatterers.

In one embodiment, the CCA may provide frequency and spatial codification by utilizing a first set of meta-materials configured to absorb EM energy within a first frequency range and reflect EM energy at frequencies outside of the first frequency range, and by utilizing a second set of meta-materials configured to absorb EM energy within a second frequency range and reflect EM energy at frequencies outside of the second frequency range.

In one embodiment, the compressive image processor may be configured to form a set of simultaneous equations of the form y=A·x+w, y being a reflection vector representing the reflection information, A being a sensing matrix representing a communication channel between the CCA and the ROI, x being the image representing the target, and w being a noise vector representing noise collected by the CCA. The compressive image processor may further be configured to configured to solve the set of simultaneous equations to determine x, the image representing the target.

In one embodiment, the sensing matrix A may be characterized by a set of singular values including a largest singular value and other singular values being smaller than the largest singular value, and wherein the CCA is configured to codify the generated EM field such that the codified EM field enhances the other singular values, with respect to an EM field produced by a non-codified antenna. In another embodiment, the compressive image processor is further configured to determine x by solving min $\|x\|_1$, such that a residual error $\|Ax-y\|_2 < \delta$, where $\delta$ is a predetermined upper bound for the residual error $\|Ax-y\|_2$.

In another aspect, an embodiment of the invention may be a method of sensing a target in a region of interest (ROI). The method may comprise generating, with a coded compressive antenna (CCA), an electro-magnetic (EM) field in the region of interest, the EM field being codified in two or more dimensions as a function of the CCA. The method may further comprise receiving, with one or more EM energy receivers, EM energy reflected by the target in the region of interest, and producing reflection information corresponding to the reflected EM energy. The method may further comprise, by a compressive sensing imaging processor operatively coupled to a memory with computer code instructions stored thereon, analyzing the reflection information to generate an image representing the target.

One embodiment may further include generating the EM field by reflecting EM energy from two or more of a distorted reflector, at least one vortex lens, and meta-materials to provide codification of the EM field in two or more dimensions.

Another embodiment may further include reflecting EM energy from a first set of components having physical dimensions of a first size, and from a second set of components having physical dimensions of a second size larger than the first size, such that the codification of the EM field is implemented at two or more scales associated with the wavelength of the EM field.

Another embodiment may further include absorbing EM energy within a first frequency range and reflecting EM energy at frequencies outside of the first frequency range, and absorbing EM energy within a second frequency range and reflecting EM energy at frequencies outside of the second frequency range.

One embodiment may further include forming a set of simultaneous equations of the form y=A·x+w, y being a reflection vector representing the reflection information, A being a sensing matrix representing a communication channel between the CCA and the region of interest, x being the image representing the target, and w being a noise vector representing noise collected by the CCA. The embodiment may further include solving the set of simultaneous equations to determine x, the image representing the target.

An embodiment may further include characterizing the sensing matrix A by a set of singular values including a largest singular value and other singular values being smaller than the largest singular value, and codifying, by the CCA, the generated EM field such that the codified EM field enhances the other singular values, with respect to an EM field produced by a non-codified antenna. Another embodiment may further include determining x by solving min $\|x\|_1$, such that a residual error $\|Ax-y\|_2 < \delta$, where $\delta$ is a predetermined upper bound for the residual error $\|Ax-y\|_2$.

In another aspect, an embodiment of the invention may be a non-transitory computer-readable medium with computer code instruction stored thereon, the computer code instructions when executed by an a processor cause an apparatus to analyze reflection information to generate an image representing a target, the target reflecting electro-magnetic (EM) energy from an EM field codified by a coded compressive antenna (CCA), the reflection information corresponding to the reflected EM energy.

In one embodiment, the computer code instructions when executed by a processor further cause the apparatus to: (i) form a set of simultaneous equations of the form y=A·x+w, y being a reflection vector representing the reflection information, A being a sensing matrix representing a communication channel between the CCA and the ROI, x being the image representing the target, and w being a noise vector representing noise collected by the CCA. The computer code instructions when executed by a processor further cause the apparatus to solve the set of simultaneous equations to determine x, the image representing the target.

In another embodiment, the computer code instructions when executed by a processor further cause the apparatus to characterize the sensing matrix A by a set of singular values including a largest singular value and other singular values being smaller than the largest singular value, and codify, by the CCA, the generated EM field such that the codified EM field enhances the other singular values, with respect to an EM field produced by a non-codified antenna, and solve min $\|x\|_1$, such that a residual error $\|Ax-y\|_2 < \delta$, where $\delta$ is a predetermined upper bound for the residual error $\|Ax-y\|_2$.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1A shows a cross sectional view of a foundation layer of a distorted reflector constructed according to an embodiment of the invention.

FIG. 1B shows a cross sectional view of a facial layer of a distorted reflector constructed according to an embodiment of the invention.

FIG. 1C illustrates an individual scatterer of the distorted reflector shown in FIG. 1B.

FIG. 1D illustrates a cross sectional view of a distorted reflector with the facial layer of FIG. 1B applied to the underlying foundational layer.

FIGS. 4A, 4B and 4C illustrate three sets of appliqué scatterers, each exhibiting a different frequency response.

FIG. 4D shows the magnitude-squared values of the distorted reflector's reflection coefficient for each set of appliqué scatterers

DETAILED DESCRIPTION OF THE INVENTION

Figure 2:
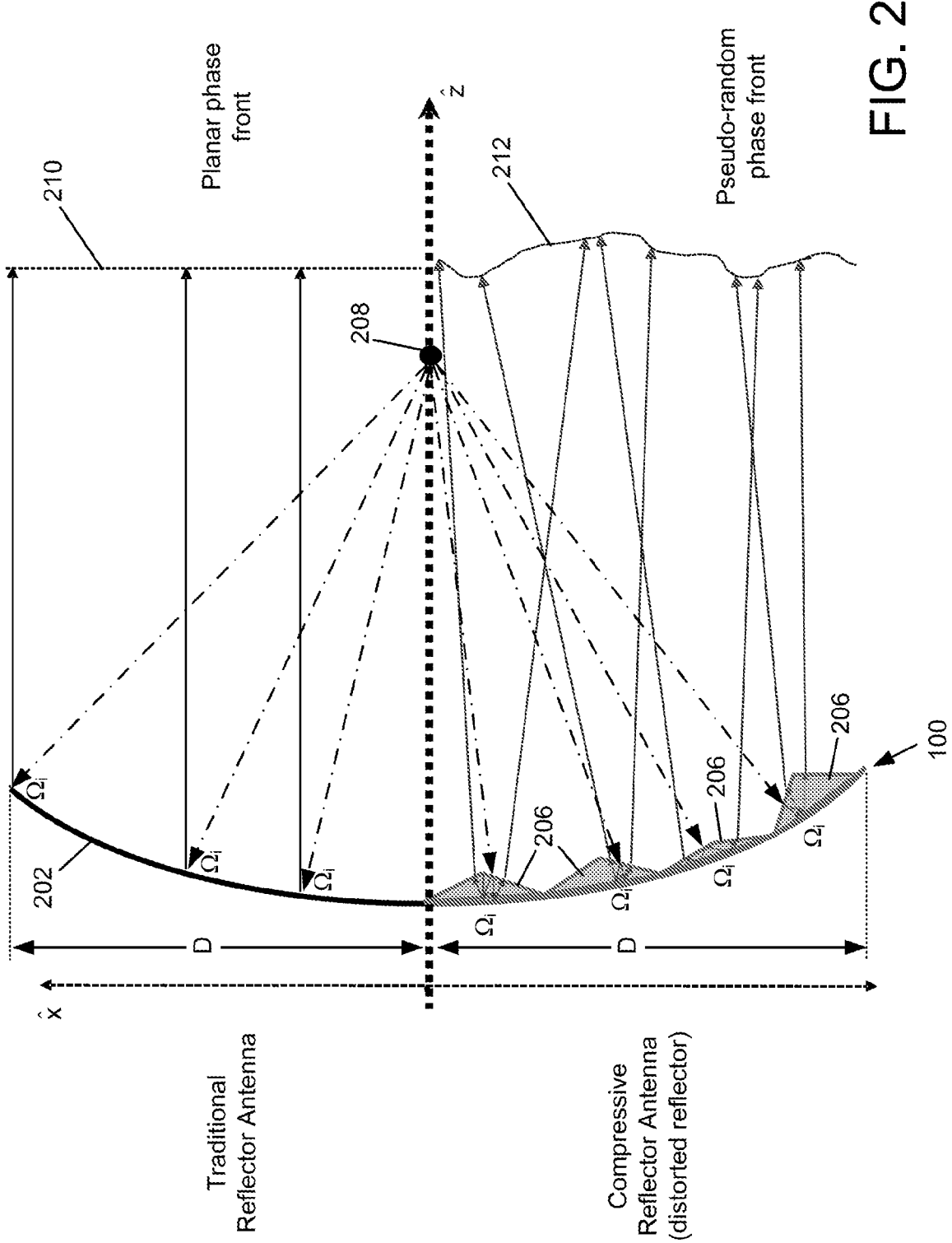
FIG. 2 shows a comparison between a traditional reflector antenna, and a distorted reflector as shown in FIG. 1D.

A description of example embodiments of the invention follows.

The teachings of all patents, published applications and references cited herein are incorporated by reference in their entirety.

The described embodiments of a compressive coded antenna (CCA) or a compressive-coded meta-antenna CCMA, which may be utilized in a remote imaging system, provide multi-dimensional codification of a radiated electromagnetic (EM) field, according to certain characteristics of the EM field. The multi-dimensional codification may be dynamic, in that the multi-dimensional codes can be modified in one or more dimensions to improve the overall channel sensing capacity. The dynamic modification of the multi-dimensional codes may be based on known or detected channel conditions, known or detected target conditions, and/or other information associated with the overall imaging environment.

The EM field characteristics may include one or more of spatial location, time, frequency, polarization, angular momentum, or other aspects of the EM field. The radiated EM field is generated by a customized spatial coded reflector aperture (when operating on reflection mode) or spatial coded screen aperture (when operating on transmission mode). The described embodiments further provide compressive sensing imaging performed on under-sampled measured data. This measured data is derived from return signals produced by an interaction of the radiated EM field with target objects illuminated by the EM field.

Multi-Dimensional Codification of EM Field

The described example embodiments may utilize at least one of (i) a reflector distorted with a pseudo-random pattern, (ii) one or more vortex lenses, (iii) one or more frequency-selective surfaces (e.g., meta-materials), and (iv) codification of the electromagnetic field at different scales, to implement the multi-dimensional codification of the radiated EM field.

Distorted Reflector

The described embodiments may include a distorted reflector configured to reflect EM energy directed at the distorted reflector by an EM energy radiating source. The underlying shape of the distorted reflector may be flat, parabolic, or other shape known in the art for redirecting (i.e., reflecting) radiated EM energy.

In one embodiment, the distorted reflector may be characterized by a cross-section that includes more than one layer. The cross section may include an underlying foundation layer and a facial layer, such that an EM radiating source directs EM energy to the distorted reflector to first encounter the facial layer. Such an arrangement facilitates convenient modification of an existing reflector installment. In another embodiment, the distorted reflector may include a single layer, such that the reflector itself is modified (e.g., machined, etched, stamped) to create an irregular surface. In yet another embodiment, the distorted reflector may consist of an aggregate of individual scatterers, secured to one another in a particular form (e.g., a parabolic dish).

The example embodiment shown in FIG. 1A is a cross sectional view of a foundation layer 102 of a distorted reflector 100. The example embodiment shown in FIG. 1B a cross sectional view of a facial layer 104 of a distorted reflector 100, including a plurality of discrete applique scatterers 106. Each individual applique scatterer 106 may have a three-dimensional (3D) shape, as shown in the example of FIG. 1C. FIG. 1D illustrates a cross sectional view of the distorted reflector 100 with the facial layer 104 applied to the underlying foundational layer 102. Each applique scatterer 106 is characterized by distinctive constituent parameters, such as conductivity ($\sigma$), permeability ($\mu$) permittivity ($\varepsilon$) and scatterer size (e.g., dimensions in Cartesian coordinates $D_x$, $D_y$, $D_z$). The applique scatterers 106 may be arranged across the foundational layer to form a facial layer 104 having a pseudo random distribution of constituent parameters.

The composition of the applique scatterers 106 may include one or more of metallic materials, dielectric materials, or meta-materials, or combinations thereof. In the described embodiments, some scatterers 106 may consist of one material, and other applique scatterers 106 may consist of another material. The specific composition may contribute to the nature of the applique scatterer's constituent parameters. The following table illustrates example permittivity and magnetic permeability values for different scatterer compositions.

| Scatterer composition | $\varepsilon_r$ | $\mu_r$ |
| --- | --- | --- |
| Metallic material | 3−j10 | 1 |
| Dielectric material | 3−j0.1 | 1 |
| Meta material | −3−j0.1 | −1 |

As described above, in some embodiments the appliqué scatterers 106 may be formed by modifying the surface of the underlying reflector itself, without implementing an additive layer on the reflector.

FIG. 2 presents a comparison between a traditional reflector antenna 202, i.e., a non-codified parabolic reflector with no appliqué scatterers, and a distorted reflector 100 with discrete appliqué scatterers as shown in FIG. 1D. FIG. 2 shows a traditional reflector antenna 202 above the z axis, i.e., x>0, and a distorted reflector 100 below the z axis, i.e. for x<0. In this example, the traditional reflector antenna 202 and the distorted reflector 100 share certain geometrical parameters such as aperture size D, focal length, and offset height.

A radiator 208 is shown at a focal point of the traditional reflector antenna 202 and the distorted reflector, directing EM radiation toward the reflectors. Although the example embodiment utilizes one radiator, alternative embodiments may utilize two or more radiators to illuminate the reflector.

As FIG. 2 illustrates, the traditional reflector antenna 202 forms a continuum of scatterers $\Omega_i$, and each individual scatterer $\Omega_i$, along the reflector 202 reflects EM energy from the radiator 208 to produce a planar phase front 210. The distorted reflector 100, on the other hand, reflects the EM energy from the radiator 208 to produce a pseudo-random phase front 212. Each discrete scatterer $\Omega_i$, 206 manipulates the incident EM energy to produce a reflection corresponding to the scatterer's distinct constituent parameters. Since the individual appliqué scatterers 206 are distributed pseudo-randomly (i.e., the constituent parameters are distributed pseudo-randomly), the resulting phase front 212 is correspondingly pseudo-random.

The distorted reflector provides spatial codification, phase-front codification, and polarization codification of the reflected EM fields at a scale within a range of 10 to 100 times the EM energy wavelength (i.e., $10\lambda$ to $100\lambda$).

Vortex Lenses

Figure 3B:
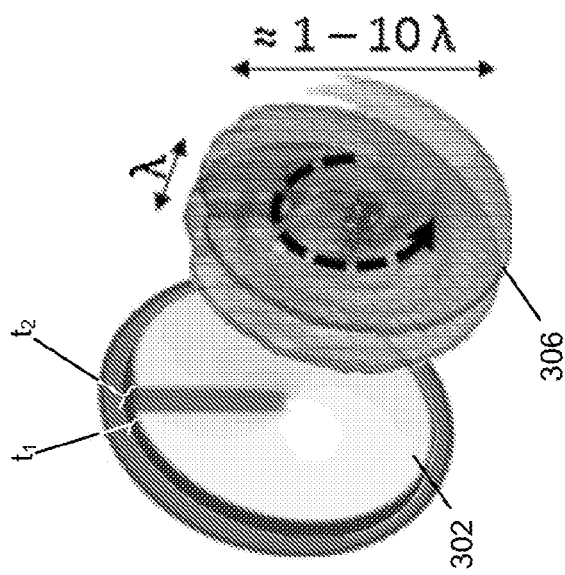
FIGS. 3A, 3B and 3C illustrate an example vortex lens constructed according to the described embodiments.
Figure 3C:
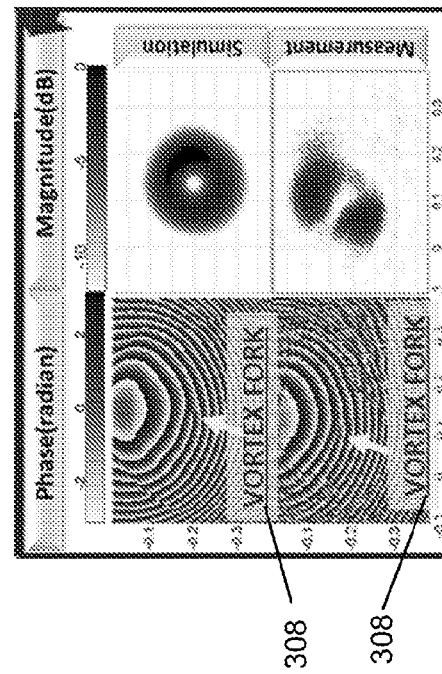
Figure 3A:
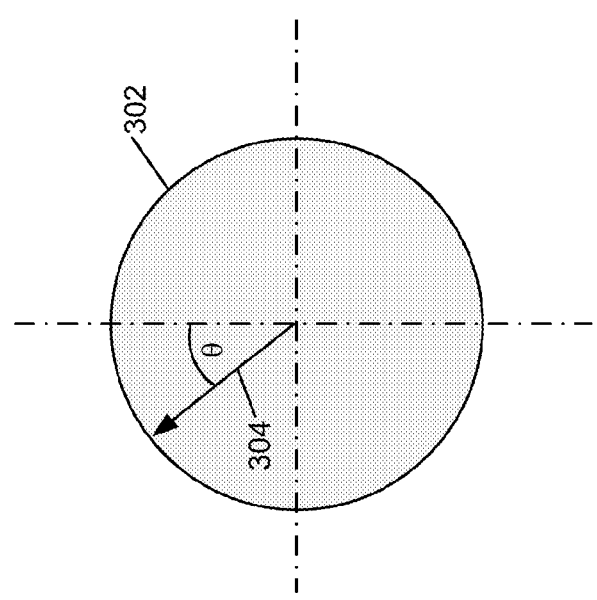

The described embodiments may include a vortex lens that manipulates incident EM energy to generate a helical beam. FIGS. 3A, 3B and 3C illustrate an example vortex lens 302 according to the described embodiments. The example vortex lens 302 is a dielectric disk, the thickness of which along its radius 304 increases linearly, from a first thickness $t_1$ to a second thickness $t_2$, as the angle $\theta$ increases from 0 to 359 degrees. The resulting vortex lens 302, shown in perspective view in FIG. 3B, forms a helical structure in terms of cross-sectional thickness. The vortex lens 302 manipulates EM energy passing through the vortex lens 302 to form a helical beam 306. The vortex lens generates a fork-like wave front, thereby controlling the momentum codification of the radiated EM energy. Multiple vortex lenses, each having FIG. 3C illustrate a vortex fork 308 that exists in the phase domain of the radiated EM energy.

Meta Materials

The described embodiments may utilize meta-materials in the antenna configuration to codify EM energy radiated by the antenna. In general, meta-materials manipulate EM energy according to the structural arrangement of the material rather than according to the properties of the material itself. Meta-materials exhibit properties with respect to EM energy not generally found in natural materials. For example, meta-materials may exhibit negative permittivity (e.g., $\varepsilon_r = -4.6$; $\varepsilon_r = -3 - j0.1$) and negative magnetic permeability (e.g., $\mu_r = -2.1$). Meta-materials may be dispersive (i.e., exhibit different properties as the frequency of the EM energy changes), and may exhibit a negative index of refraction. Further, the EM energy interactive properties of a meta-material may change with respect to an electrical bias (e.g., voltage bias) applied to the meta-material.

The appliqué scatterers described herein for the distorted reflector of the described embodiments may include meta-materials. FIGS. 4A-4D illustrate one example embodiment of such meta-material appliqué scatterers forming multiple discrete meta-material antennas (MMAs).

FIGS. 4A, 4B and 4C illustrate a first set of appliqué scatterers 402 (referred to as MMA1) distributed on a distorted reflector 408, a second set of appliqué scatterers 404 (referred to as MMA2) distributed on a distorted reflector 408, and a third set of applique scatterers 406 (referred to as MMA3) distributed on a distorted reflector 408. Each set of appliqué scatters 402, 404 and 406 absorbs EM energy at a different frequency. In FIGS. 4A, 4B and 4C, only a select number of appliqué scatterers for each set are identified for the sake of clarity.

In this example, the first set of appliqué scatterers absorb energy at approximately 49.8 GHz, the second set of scatterers absorb EM energy at approximately 51.8 GHz, and the third set of scatterers absorb EM energy at approximately 53.8 GHz. Each set of appliqué scatterers presents a unique pseudo-random pattern, which (as described herein) produces a unique pseudo-random phase front of reflected EM energy, when illuminated by an EM energy source (from, for example, the focal point 410).

FIG. 4D illustrates the magnitude-squared values of the distorted reflector's reflection coefficient (i.e., $|\Gamma|^2$), with respect to frequency, for each set of appliqué scatterers. FIG. 4D shows that since the first set of appliqué scatterers 402 absorbs EM energy at approximately 49.8 GHz, the distorted reflector 408 only reflects EM energy from the second set of appliqué scatterers 404 and the third set of appliqué scatterers 406, thereby producing two unique pseudo-random wave fronts; one from MMA2 404 and one from MMA3 406. Since the second set of appliqué scatterers 404 absorbs EM energy at approximately 51.8 GHz, the distorted reflector 408 only reflects EM energy from the first set of appliqué scatterers 402 and the third set of appliqué scatterers 406, thereby producing two unique pseudo-random wave fronts; one from MMA1 402 and one from MMA3 406. And, since the third set of appliqué scatterers 406 absorbs EM energy at approximately 53.8 GHz, the distorted reflector 408 only reflects EM energy from the first set of appliqué scatterers 402 and the second set of appliqué scatterers 404, thereby producing two unique pseudo-random wave fronts; one from MMA1 402 and one from MMA2 404. The distorted reflector therefore provides frequency-dependent codification of the radiated EM fields.

In some embodiments, the specific absorption point of a set of scatterers may be changed dynamically by applying an electrical bias to the set of scatters.

Figure 5:
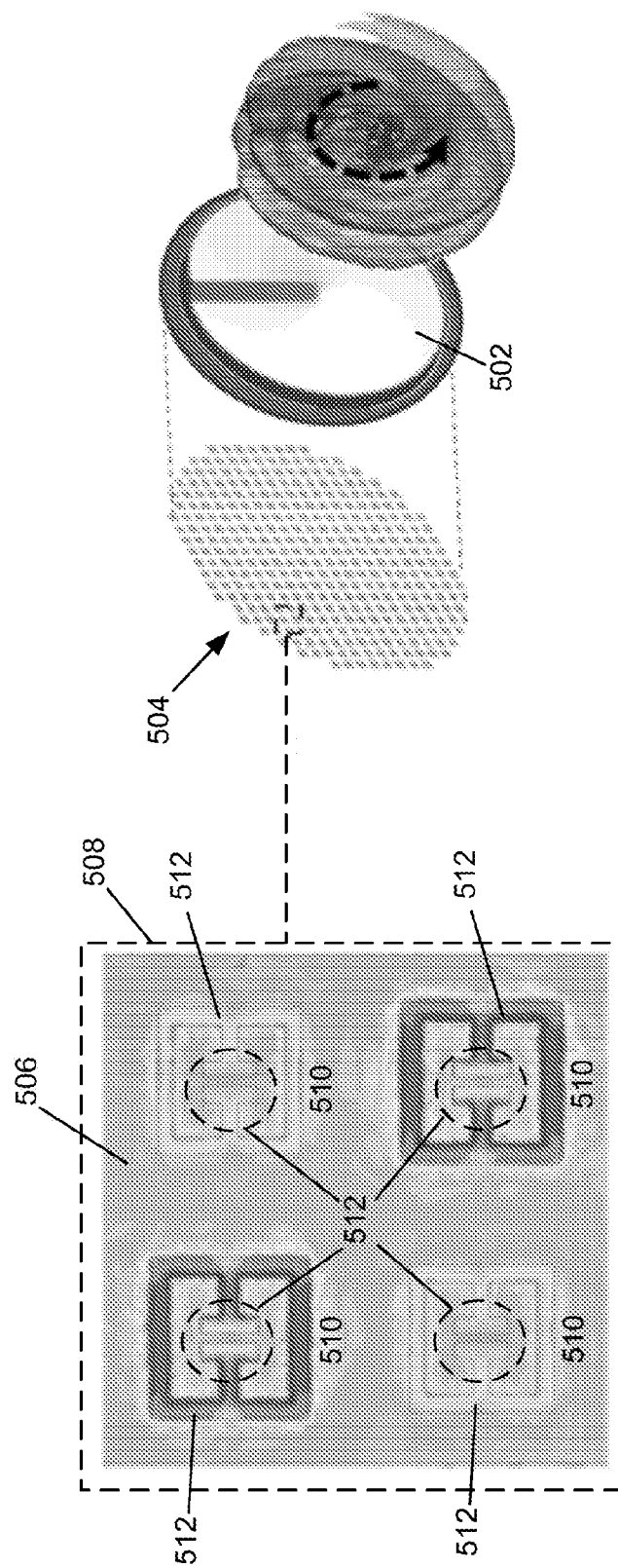
FIG. 5 illustrates an example embodiment that utilizes ELCs in conjunction with vortex lenses.

In some embodiments, the meta-materials may include electrical-inductor-capacitors (ELCs), although alternative embodiments may use other meta-materials known in the art. FIG. 5 illustrates an example embodiment that utilizes ELCs in conjunction with vortex lenses. The vortex lens 502, described in more detail elsewhere herein, is backed by an array 504 of discrete ELCs. One example ELC element 506 from the array 504 is shown in expanded view 508. The example ELC element 506 includes four individual ELCs 510, although other embodiments may include fewer or more individual ELCs.

Each ELC includes a conductive ring 512 enclosing a capacitor 514, with each capacitor plate conductively connected to a location of the conductive ring 512. In the example embodiment of FIG. 5, the locations are on opposite sides of the conductive ring 512, although other locations on the conductive ring may be used. The conductive ring 512 forms an inductor, which, combined with the capacitor, forms an LC resonator that resonates at a characteristic frequency depending on the physical parameters of the conductive ring 512 and the capacitor 514 (e.g., the line width and thickness of the material forming the conductive ring 512 and capacitor plates, the space between the capacitor plates, and the dielectric constant of material between the capacitor plates).

Each ELC absorbs EM energy at the resonant frequency of the ELC. The array 504 of ELC elements 506 may include several subsets of ELC elements, each subset characterized by a different resonant frequency. Such an arrangement may provide frequency dependent codification of the EM energy passing through the vortex lens 502, similar to the effect described with respect to FIGS. 4A-4D for the MMA appliqué scatterers.

Figure 6:
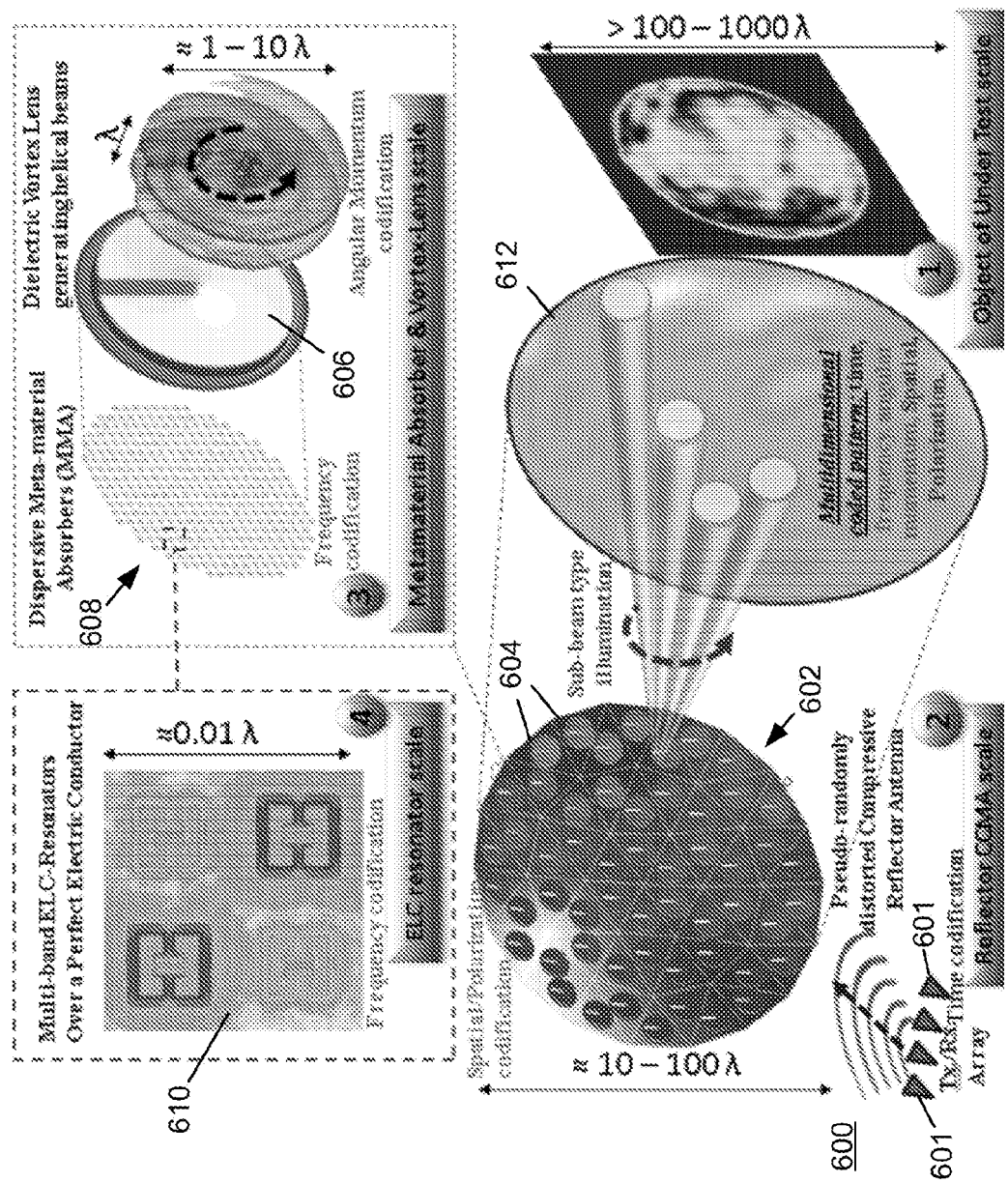
FIG. 6 illustrates an example embodiment of a compressive coded meta-antenna that incorporates a distorted reflector, vortex lenses and meta-materials.

FIG. 6 illustrates an example embodiment of a compressive coded meta antenna (CCMA) 600 that incorporates a distorted reflector, vortex lenses and meta-materials. The CCMA 600 is illuminated by one or more EM energy sources 601. The example CCMA 600 shows a reflector 602 covered by a plurality of appliqué scatterers 604. The collection of appliqué scatterers 604 distributed across the reflector 602 may form a distorted reflector surface, as described with respect to FIGS. 1A-1D and FIG. 2, thereby providing spatial codification and polarization codification to the CCMA 600. Portions of each appliqué scatterer 604 may further include sub-scatterers that provide further pseudo-random distortion to the overall distorted reflector surface.

Each appliqué scatterer 604 may include a dielectric vortex lens 606 as described with respect to FIGS. 3A-3C, thereby providing the CCMA 600 with angular momentum codification. Each vortex lens 606 may be backed by an ELC array 608 of ELC elements 610, as described with respect to FIG. 5, thereby providing the CCMA 600 with frequency codification.

The CCMA 600 provides a sub-beam type illumination 612 codified in time, frequency, angular momentum, spatial location and polarization, resulting from the combined effects of the reflector 602, the appliqué scatterers 604, the vortex lenses 606 and the array of meta-material absorbers 608.

The described embodiments CCAs and CCMAs may utilize a combination of the components described herein, i.e., reflector (distorted or undistorted), vortex lenses, meta-materials and codification at different scales. For example, an embodiment may include a distorted reflector combined with vortex lenses. Another embodiment may include a distorted reflector combined with one or more meta-materials. Yet another embodiment may include a non-distorted reflector, combined with one or more of meta-materials and vortex lenses.

The example CCMA embodiment shown in FIG. 6 provides codification in at least five different field characteristics, and in at least three different scales. The distorted reflector element provides spatial codification and polarization codification of the reflected EM fields at a scale within a range of 10 to 100 times the EM energy wavelength (i.e., $10\lambda$ to $100\lambda$). The vortex lens elements provide angular momentum codification at a scale within a range of 1 to 10 times the EM energy wavelength (i.e., $\lambda$ to $10\lambda$), and the ELC resonator elements provide frequency codification at a scale of approximately one one-hundredth of the EM energy wavelength (approximately $0.01\lambda$). And, one or more of the CCMA elements may vary the respective EM field characteristic with respect to time.

Compressive Sensing Imaging Using a CCA or CCMA

The imaging problem of extracting target information from EM energy reflected by a target can be viewed as solving a linear system of equations that can be expressed in a matrix form as follows:

$$y = A \cdot x + w$$

where A is the sensing matrix, x is the image, and w represents the noise collected by the receiving antenna.

Under this framework, the sensing matrix A can be seen as a communications channel, which is used to send information from the image domain x to the measured field domain y in the presence of noise w. The capacity of such a channel can be derived by performing a singular value decomposition of the channel matrix A:

$$A = U \Sigma V$$

where $V = (v_1, \ldots, v_{Np})$ and $U = (u_1, \ldots, u_{Nt})$ are, respectively, $N_p \times N_p$ and $N_t \times N_t$ matrices containing a set of orthonormal input and output basis directions for A; the matrix $\Sigma = \text{diag}(\lambda_1, \ldots, \lambda_{Nmin})$, where $N_{min} = \min(N_t, N_p)$, is a $N_p \times N_t$ matrix containing the real non-zero singular values of A in the diagonal and zeros elsewhere.

When the $l^{th}$ input base direction $v_l$ is used in the image domain and propagated through the A, a $\lambda_l u_l$ response is generated in the output-measured field domain. Therefore, $\{\lambda_l, v_l, u_l\}$ can be seen as the parameters of the $l^{th}$ orthogonal channel of the matrix A. The $N_{min}$ orthogonal parallel channels provide the following capacity, measured in bits/s/Hz:

$$C = \sum_{l=1}^{Nmin} \log-2\left(1 + \frac{P_l \lambda_l^2}{N_0}\right)$$

where $P_l/N_0$ is the signal-to-noise ratio in the $l^{th}$ orthogonal channel. The parameters $\{\sigma_i, \mu_i, \varepsilon_i, Dx, Dy, Dz\}$ can be used to control the singular values of the channel matrix A and, therefore, the channel capacity of the CCA or CCMA.

The imaging operation is based on solving $y = A \cdot x + w$ using compressive sensing techniques for a limited amount of data. This imaging operation solves the following convex optimization problem:

$$\min \|x\|_1 \ s \cdot t \|Ax - y\|_2 < \delta$$

where $\delta$ is an upper bound for the residual error $\|Ax-y\|_2$. Several techniques can be used for solving general non-smooth convex optimization problems, in order to solve the convex optimization problem.

The performance of the CCA or CCMA may be evaluated in a millimeter-wave imaging application as described below. The table below describes the parameters used in the numerical simulation.

| PARAMETER | CONFIGURATION | PARAMETER | CONFIGURATION |
|---|---|---|---|
| D | $200\lambda = 1$ m | $N\theta$ | 31 |
| f | $200\lambda = 1$ m | $\theta r$ | 90 degrees |
| $h_o$ | $0\lambda = 0$ m | Nf | 3 |
| Nt | 93 | Np | 25000 |

Figure 7:
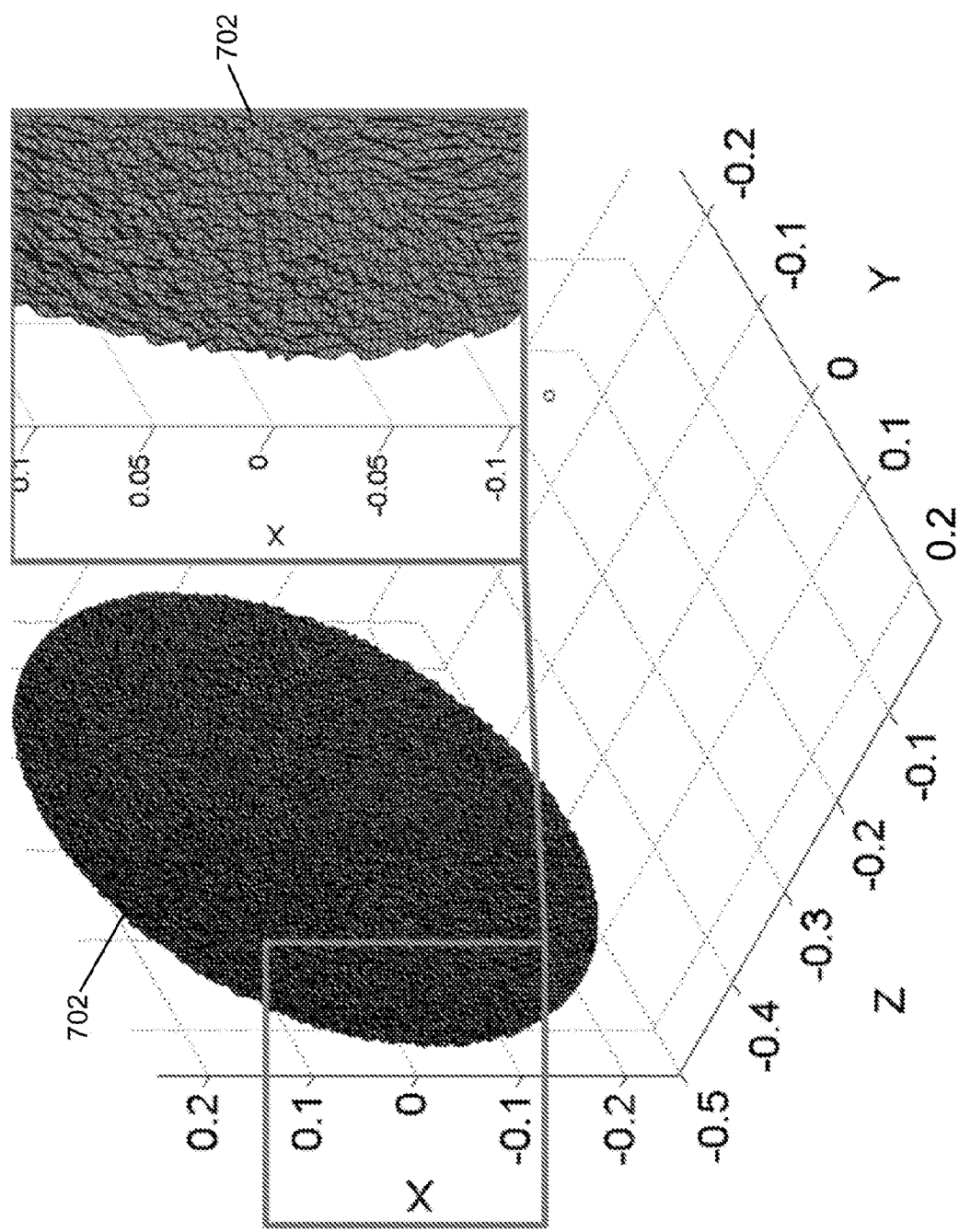
FIG. 7 illustrates a distorted reflector constructed according to an embodiment of the invention, used for an example performance analysis.

The total number of measurements used for the reconstruction is 93 in this example. The center frequency of the millimeter wave system is 60 GHz, and it has a bandwidth of 6 GHz. In this evaluation, each scatterer $\Omega_i$ of the CCA/CCMA 702 being analyzed, shown in FIG. 7 as a triangular facet, is made of a Perfect Electric Conductor (PEC), so $\sigma_i = \sigma_{PEC}$. The CCA/CCMA is discretized into triangular patches that are characterized by an average size of:

$$<D_x> = <D_y> = 1.5\lambda_c = 7.5 \cdot 10^{-3} \text{ m in } \hat{x} \text{ and } \hat{y}; \text{ dimensions (see, e.g., FIG. 1B).}$$

The parameter $\lambda_c = 5 \cdot 10^{-3}$ m is the wavelength at the center frequency. The scatterer size $D_z$ of each triangle in the $\hat{z}$ dimension is modeled as a uniform random variable distributed in the interval $(-0.54\lambda_c = 2.7 \cdot 10^{-3}, 0.54\lambda_c = 2.7 \cdot 10^{-3})$ m. The imaging Region Of Interest (ROI) is located $Z_0 = 194.87\lambda_c = 0.9743$ m away from the focal point of the CCA/CCMA; and it encloses a volume determined by the following dimensions: $\Delta x_0 = 36\lambda_c = 0.18$ m in $\hat{x}$; $\Delta y_0 = 36\lambda_c = 0.18$ m in $\hat{y}$; and $\Delta z_0 = 7.5\lambda_c = 37.5 \cdot 10^{-3}$ m in $\hat{z}$.

The ROI is discretized into cubes of side length of $l = 1.5\lambda_c = 7.5 \cdot 10^{-3}$ m. In this example evaluation, three configurations are analyzed:

1) a non-coded, traditional reflector antenna (TRA) without scatterers on its surface;
2) a compressive coded antenna (CCA) with a feeding horn located in the focal point of the reflector (CCA-in-focus); and
3) a CCA with a feeding horn displaced $\Delta RX = 10\lambda_c$ $\hat{x} = 0.05$ $\hat{x}m$ off the focal point of the reflector (CCA-off-focus).

Figure 8:
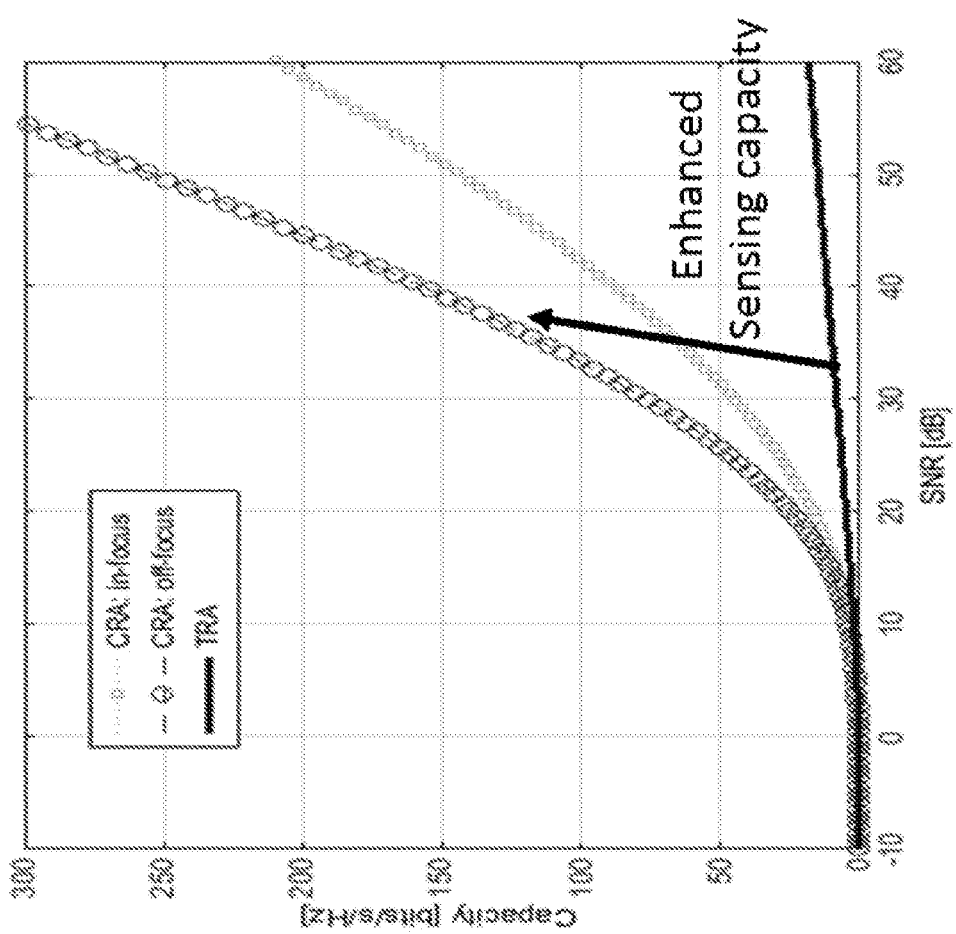
FIG. 8 shows channel capacity with respect to SNR for three different antenna configurations.

The CCA-off-focus introduces an additional quadratic phase aberration term in the electromagnetic field at the imaging plane, when compared to that produced by the CCA-in-focus. The off-focus CCA consequently possesses a singular value distribution with minimal dispersion, which ultimately provides the highest capacity of the three configurations. The capacity of the three configurations is presented in FIG. 8 for different signal to noise ratios.

Figure 9B:
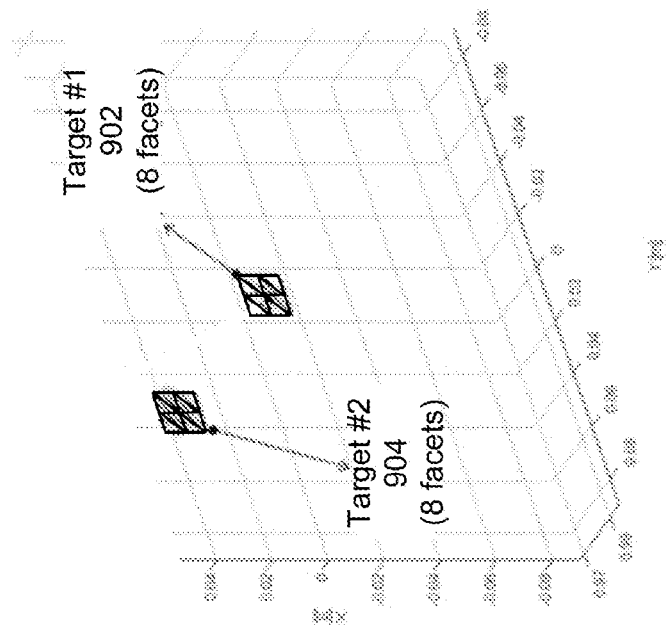
FIGS. 9A and 9B illustrate imaging capabilities of tradition processing and of the described embodiments.
Figure 9A:
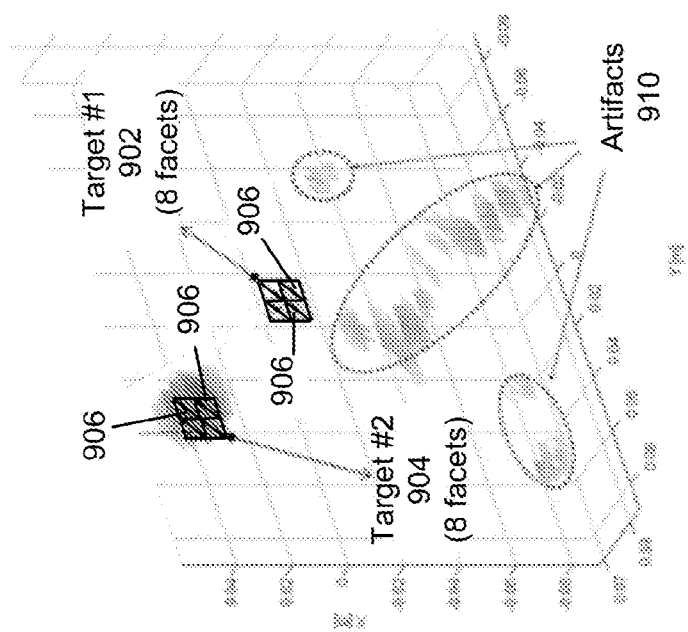

The imaging capabilities of tradition processing, and of processing conducted according to the described embodiments, are shown in FIGS. 9A and 9B. A uniform white noise is considered in the simulation, producing a signal-to-noise ratio of 25 dB. Targets 902 and 904 are represented by transparent triangles 906 with a black border FIGS. 9A and 9B. FIG. 9A shows the target and a reconstructed image 908 when a traditional synthetic aperture radar (SAR) method is used. An aliasing effect dominates imaging process, so multiple artifacts 910 appear in the reconstructed image. FIG. 9B shows that the targets 902, 904 can be successfully reconstructed without artifacts, when the compressive sensing image processing as described herein is used in combination with the CCA-off-focus configuration.

Figure 10:
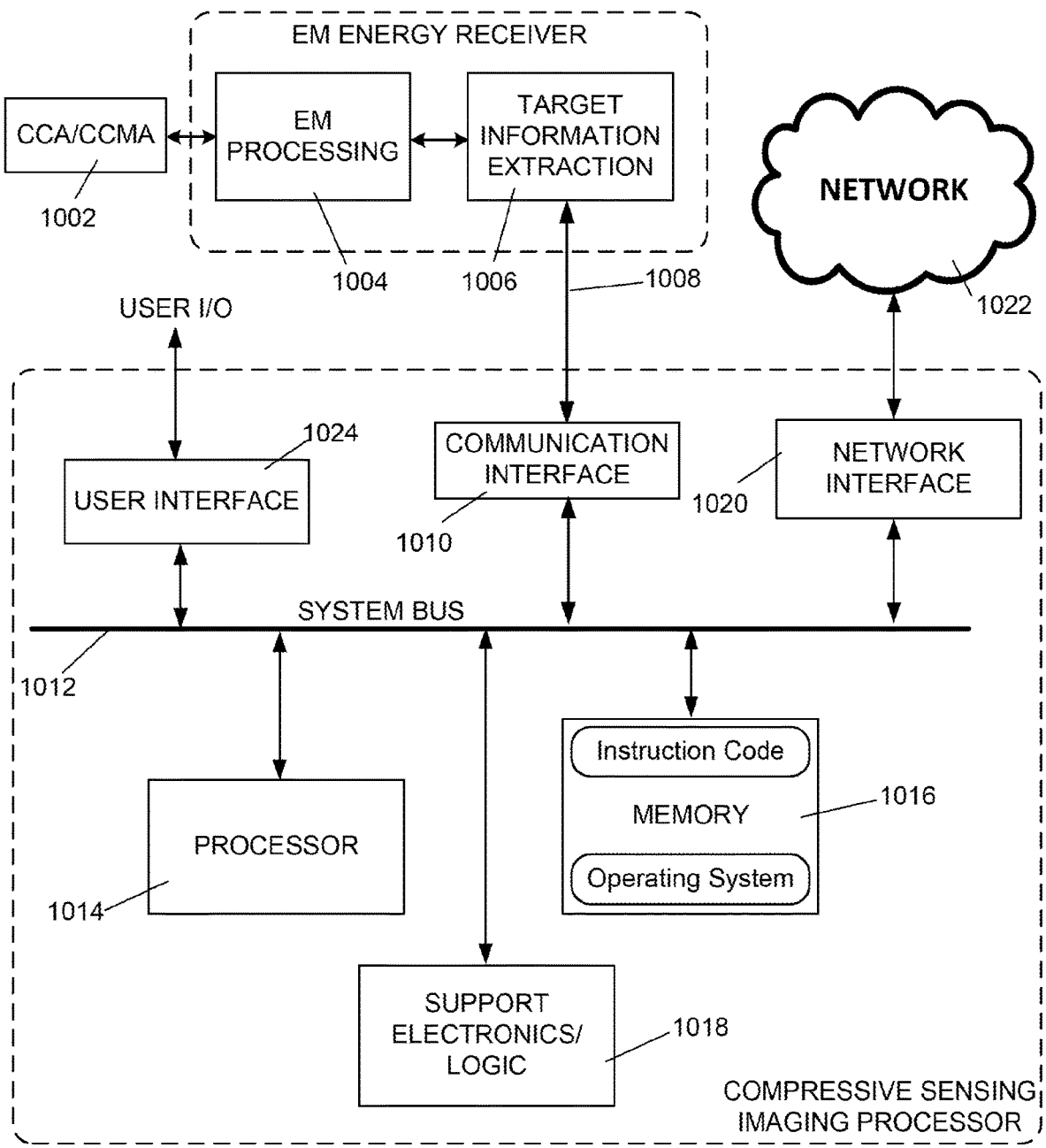
FIG. 10 illustrates an example of a system for implementing compressive sensing imaging using a CCA or CCMA, according to an embodiment of the invention.

FIG. 10 illustrates an example embodiment of a system 1000 for implementing compressive sensing imaging using a CCA or CCMA as described herein. The example system 1000 includes a CCA or CCMA 1002 electrically coupled to an EM processing unit 1004, which is further electrically coupled to a target extraction unit 1006. The EM processing unit 1004 and the target extraction unit 1006 are referred to herein as an EM energy receiver 1007. The CCA or CCMA 1002 and the EM energy receiver 1007 collectively operate to generate multi-dimensionally codified EM fields to illuminate a target, and provide extracted target information (i.e., image data) 1008 to a communications interface 1010.

The communications interface 1010 buffers and formats the extracted target information 1008 into a form suitable for transfer to a system bus 1012. A processor 1014 coordinates with the communications interface 1010 to accept the extracted target information 1008 and store the information 1008 into a memory 1016. The system may also include support electronics/logic 1018, a network interface 1020 for communicating with an external network 1022, and a user interface 1024 for communicating user information between a system user and the system bus. The communications interface 1010, the system bus 1012, the system bus 1012, the processor 1014, the memory 1016, the support electronics/logic 1018, the network interface 1020 and the user interface 2024 are collectively referred to herein as the compressive sensing image processor 1026.

The memory 1016 also includes instruction code for execution by the processor 1014 to perform system operations. The instruction code may include instructions for performing the compressive sensing imaging as described herein, and an operating system for coordinating and managing the compressive sensing image processor 1026.

Figure 11:
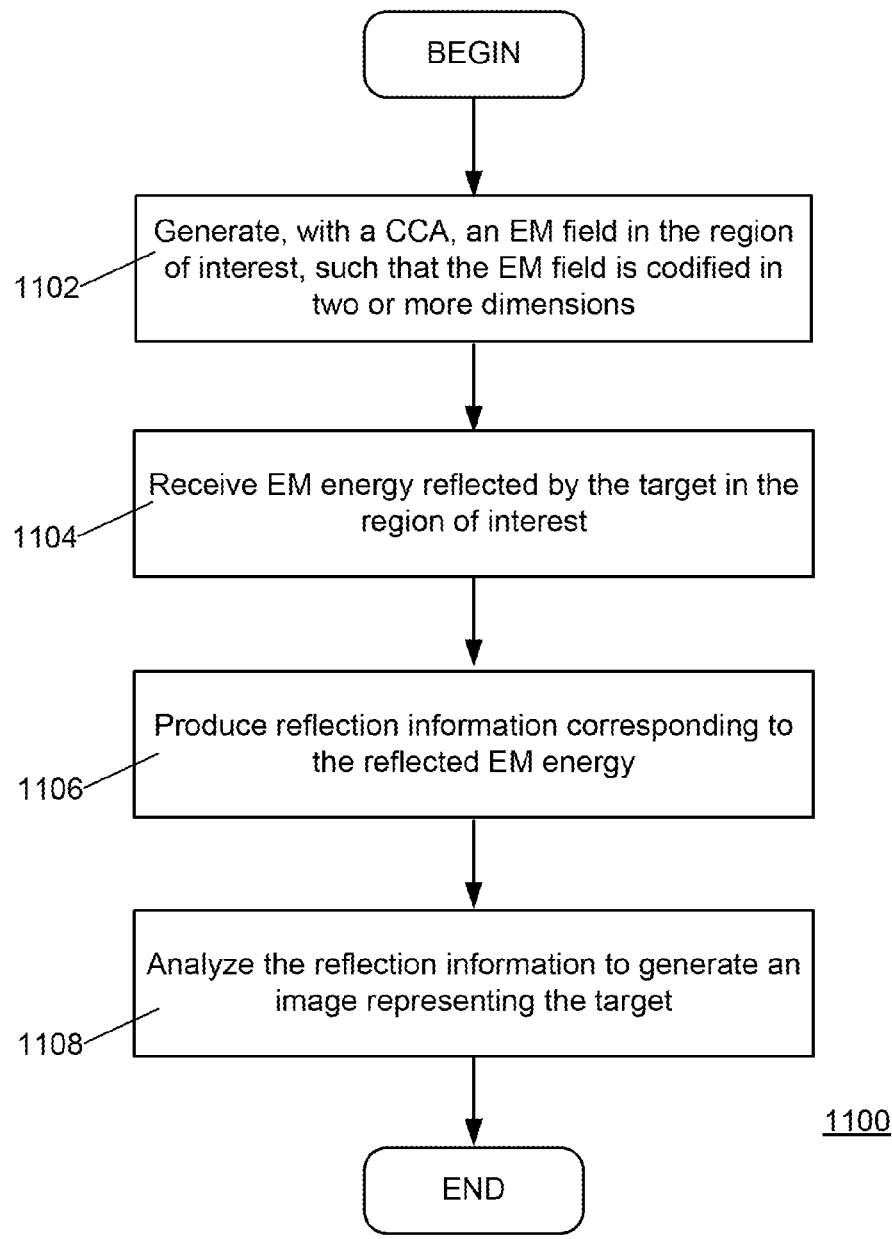
FIG. 11 illustrates an example embodiment, according to the invention, of a method of identifying a target in a region of interest

FIG. 11 illustrates an example embodiment, according to the invention, of a method 1100 of identifying a target in a region of interest. The method begins by generating 1102, with a coded compressive antenna (CCA), an electro-magnetic (EM) field in the region of interest, such that the EM field is codified in two or more dimensions. The method further includes receiving 1104, with an EM energy receiver, EM energy reflected by the target in the region of interest, and producing 1106 reflection information corresponding to the reflected EM energy. The method also includes analyzing 1108, with a compressive sensing imaging processor, the reflection information to generate an image representing the target.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A system for sensing a target in a region of interest (ROI), comprising:
   a compressive coded antenna (CCA) configured to generate an electro-magnetic (EM) field in the ROI, the EM field being codified in two or more dimensions as a function of the CCA, an aperture of the CCA being disposed across three dimensions;
   one or more EM energy receivers configured to receive EM energy reflected by the target in the ROI, and produce reflection information corresponding to the reflected EM energy; and
   a compressive sensing imaging processor configured to analyze the reflection information and to generate an image representing the target.

2. The system of claim 1, wherein the CCA utilizes two or more of (i) a distorted reflector, (ii) at least one vortex lens, and (iii) meta-materials to provide codification of the EM field in two or more dimensions.

3. The system of claim 1, wherein the two or more dimensions are selected from the group consisting of spatial location, time, frequency, polarization and angular momentum.

4. The system of claim 1, wherein the codification of the EM field is implemented at two or more scales associated with the wavelength of the EM field.

5. The system of claim 1, wherein the CCA generates the EM field by operating in reflective mode, reflecting EM energy generated by one or more EM energy sources.

6. The system of claim 1, wherein the CCA provides spatial codification by reflecting EM energy from a reflector surface distorted by a plurality of three-dimensional appliqué scatterers.

7. The system of claim 1, wherein the CCA provides frequency and spatial codification by:
(i) utilizing a first set of meta-materials configured to absorb EM energy within a first frequency range and reflect EM energy at frequencies outside of the first frequency range, and
(ii) utilizing a second set of meta-materials configured to absorb EM energy within a second frequency range and reflect EM energy at frequencies outside of the second frequency range.

8. The system of claim 1, wherein the compressive image processor is:
(i) configured to form a set of simultaneous equations of the form y=A·x+w, y being a reflection vector representing the reflection information, A being a sensing matrix representing a communication channel between the CCA and the ROI, x being the image representing the target, and w being a noise vector representing noise collected by the CCA; and
(ii) configured to solve the set of simultaneous equations to determine x, the image representing the target.

9. The system of claim 8, wherein the sensing matrix A is characterized by a set of singular values including a largest singular value and other singular values being smaller than the largest singular value, and wherein the CCA is configured to codify the generated EM field such that the codified EM field enhances the other singular values, with respect to an EM field produced by a non-codified antenna.

10. The system of claim 8, wherein the compressive image processor is further configured to determine x by solving:
min $\|x\|_1$, such that a residual error $\|Ax-Y\|_2 < \delta$, where $\delta$ is a predetermined upper bound for the residual error $\|Ax-y\|_2$.

11. A method of sensing a target in a region of interest (ROI), comprising:
generating, with a compressive coded antenna (CCA), an electro-magnetic (EM) field in the region of interest, the EM field being codified in two or more dimensions as a function of the CCA, an aperture of the CCA being disposed across three dimensions;
receiving, with one or more EM energy receivers, EM energy reflected by the target in the region of interest, and producing reflection information corresponding to the reflected EM energy; and
by a compressive sensing imaging processor operatively coupled to a memory with computer code instructions stored thereon, analyzing the reflection information to generate an image representing the target.

12. The method of claim 11, further including generating the EM field by reflecting EM energy from two or more of (i) a distorted reflector, (ii) at least one vortex lens, and (iii) meta-materials to provide codification of the EM field in two or more dimensions.

13. The method of claim 11, further including reflecting EM energy from a first set of components having physical dimensions of a first size, and from a second set of components having physical dimensions of a second size larger than the first size, such that the codification of the EM field is implemented at two or more scales associated with the wavelength of the EM field.

14. The method of claim 11, further including
(i) absorbing EM energy within a first frequency range and reflecting EM energy at frequencies outside of the first frequency range, and
(ii) absorbing EM energy within a second frequency range and reflecting EM energy at frequencies outside of the second frequency range.

15. The method of claim 11, further including:
(i) forming a set of simultaneous equations of the form y=A·x+w, y being a reflection vector representing the reflection information, A being a sensing matrix representing a communication channel between the CCA and the region of interest, x being the image representing the target, and w being a noise vector representing noise collected by the CCA; and
(ii) solving the set of simultaneous equations to determine x, the image representing the target.

16. The method of claim 15, further including:
characterizing the sensing matrix A by a set of singular values including a largest singular value and other singular values being smaller than the largest singular value, and
codifying, by the CCA, the generated EM field such that the codified EM field enhances the other singular values, with respect to an EM field produced by a non-codified antenna.

17. The method of claim 15, further including determining x by solving:
min $\|x\|_1$, such that a residual error $\|Ax-y\|_2 < \delta$, where $\delta$ is a predetermined upper bound for the residual error $\|Ax-y\|_2$.

18. A non-transitory computer-readable medium with computer code instruction stored thereon, the computer code instructions, when executed by a processor hosted by an apparatus, cause the apparatus to:
generate a multi-dimensionally codified electromagnetic (EM) field arranged to illuminate a target; and
analyze reflection information generated by the target in response to the multi-dimensionally codified electromagnetic (EM) field to generate an image representing a target.

19. The non-transitory computer-readable medium of claim 18, wherein the computer code instructions when executed by a processor further cause the apparatus to:
(i) form a set of simultaneous equations of the form y=A·x+w, y being a reflection vector representing the reflection information, A being a sensing matrix representing a communication channel between the CCA and the ROI, x being the image representing the target, and w being a noise vector representing noise collected by the CCA; and
(ii) solve the set of simultaneous equations to determine x, the image representing the target.

20. The non-transitory computer-readable medium of claim 19, wherein the computer code instructions when executed by a processor further cause the apparatus to:
characterize the sensing matrix A by a set of singular values including a largest singular value and other singular values being smaller than the largest singular value,
codify, by the CCA, the generated EM field such that the codified EM field enhances the other singular values, with respect to an EM field produced by a non-codified antenna; and solve min $\|x\|_1$, such that a residual error $\|Ax-y\|_2 < \delta$, where $\delta$ is a predetermined upper bound for the residual error $\|Ax-y\|_2$.

* * * * *